(12) United States Patent
Eneau et al.

(10) Patent No.: US 7,031,803 B2
(45) Date of Patent: Apr. 18, 2006

(54) INSTALLATION FOR TREATING PRODUCTS AND CORRESPONDING DATA ACQUISITION COMPONENT

(75) Inventors: Jean-Philippe Eneau, Basse-Goulaine (FR); Dominique Metais, Thouare sur Loire (FR); Raphaël Reveau, Cordemais (FR)

(73) Assignee: JOUAN, Saint-Herblain (FR)

( * ) Notice: Subject to any disclaimer, the term of this patent is extended or adjusted under 35 U.S.C. 154(b) by 0 days.

(21) Appl. No.: 10/647,342

(22) Filed: Aug. 26, 2003

(65) Prior Publication Data
US 2005/0261794 A1    Nov. 24, 2005

(30) Foreign Application Priority Data
Aug. 26, 2002    (FR)    ................................... 02 10583

(51) Int. Cl.
*G08B 13/14*    (2006.01)
(52) U.S. Cl. .................. 700/225; 700/219; 700/228; 700/244; 340/572.1; 340/572.4; 340/572.8; 235/439; 235/462.25; 235/462.46
(58) Field of Classification Search ................ 700/115, 700/225, 219, 228, 244; 340/572.1, 572.4, 340/572.8; 235/439, 462.25, 462.46
See application file for complete search history.

(56) References Cited

U.S. PATENT DOCUMENTS

| | | | | |
|---|---|---|---|---|
| 4,628,193 | A | | 12/1986 | Blum |
| 5,629,981 | A | * | 5/1997 | Nerlikar ...................... 713/168 |
| 6,614,351 | B1 | * | 9/2003 | Mann et al. .............. 340/572.1 |
| 6,646,552 | B1 | * | 11/2003 | Lippert ..................... 340/572.1 |
| 2002/0080031 | A1 | * | 6/2002 | Mann et al. .............. 340/572.1 |

FOREIGN PATENT DOCUMENTS

| | | | |
|---|---|---|---|
| GB | 2 371 722 | | 7/2002 |
| GB | 2371722 | A * | 7/2002 |
| JP | 2-074889 | | 3/1990 |

* cited by examiner

*Primary Examiner*—Leo Picard
*Assistant Examiner*—Michael D. Masinick
(74) *Attorney, Agent, or Firm*—Young & Thompson

(57) ABSTRACT

An installation (1) for the treatment of products comprises:
  containers (2) for products to be treated and equipped with elements (14) for emitting radiofrequency waves,
  at least one workstation (5–7) for carrying out a product treatment operation, the workstation being equipped with elements (25–27) for emitting radiofrequency waves, and
  a system for managing information relating to the products, the system comprising a database (70), an information processing unit (62) and at least one component (10) which may be adapted to the body or garment of an operator, the component comprising:
    at least one antenna (50) for receiving the radiofrequency waves, and
    elements (52, 54, 56) for transmitting, to the information processing unit (62), identification information received from the elements (14, 25–27) for emitting radiofrequency waves.

17 Claims, 3 Drawing Sheets

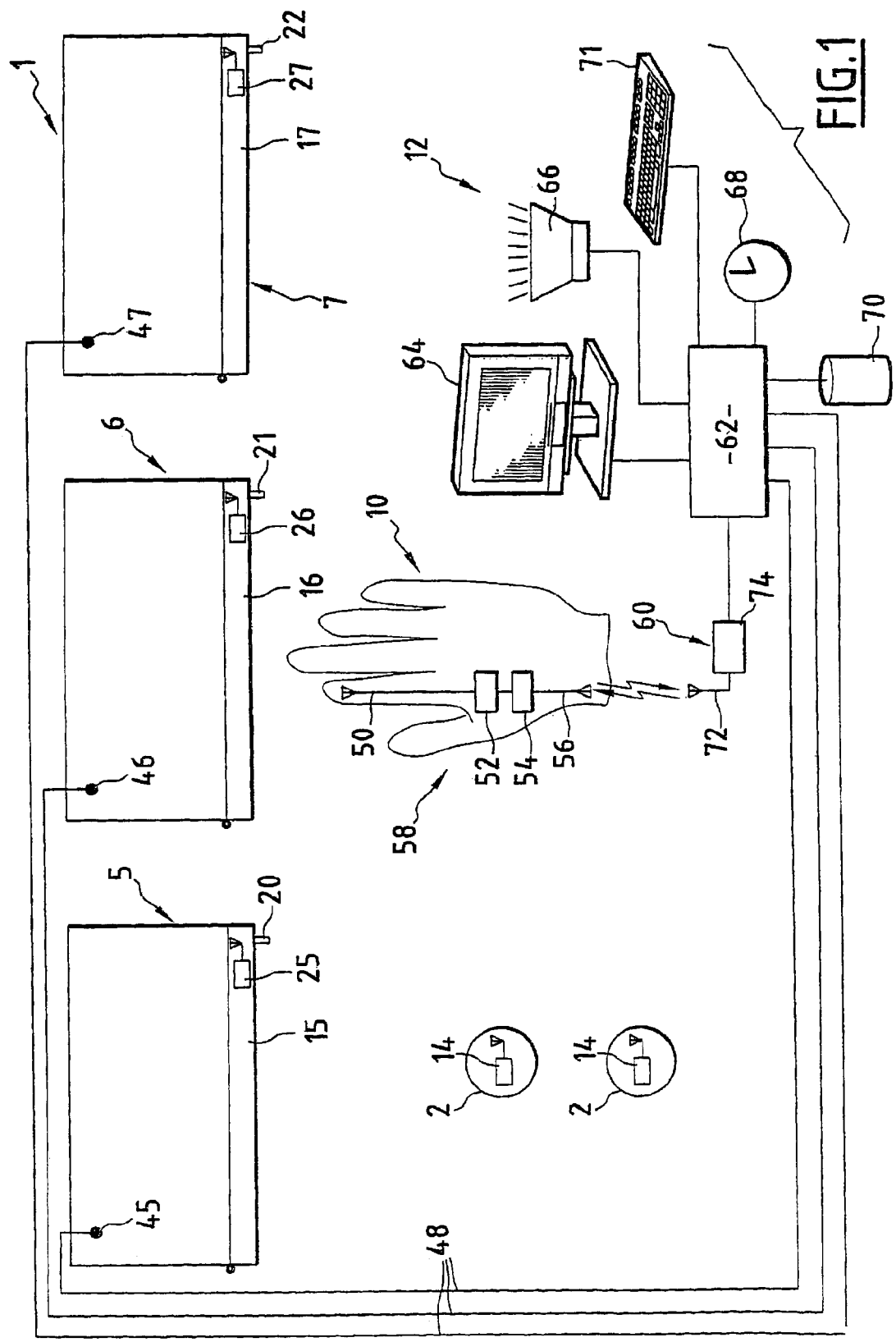

INSTALLATION FOR TREATING PRODUCTS AND CORRESPONDING DATA ACQUISITION COMPONENT

BACKGROUND OF THE INVENTION

The present invention relates to an installation for the treatment of products, of the type comprising:
- containers for products to be treated and equipped with means for emitting radiofrequency waves to supply product identification information,
- at least one workstation for carrying out a product treatment operation, the workstation being equipped with means for emitting radiofrequency waves to supply workstation identification information, and
- a system for managing information relating to the products, the system comprising a database, an information processing unit and at least one component itself comprising:
  - at least one antenna for receiving the radiofrequency waves emitted by the emitting means, and
  - means for transmitting, to the information processing unit, identification information received from the means for emitting radiofrequency waves so that the information processing unit combines the product and workstation identification information and stores it in the database.

The invention applies, in particular, to the treatment of biological substances or samples and, in particular, to the culture, preservation and/or analysis of cells or microorganisms.

An installation of the aforementioned type is known from the document FR-2 817 370. The means for emitted radiofrequency waves from the containers and workstations are transponders. The component for receiving radiofrequency waves comprises a support plate intended to receive the containers of products to be treated. The plate is equipped with an antenna for receiving radiofrequency waves and with a means for transmitting the received information from the transponders to the information processing unit.

An installation of this type allows, in addition to the product treatment, tracking or traceability of the treated products by combining information relating to their identity, and to that of the workstations in which they have been placed and therefore the treatment operations to which they have been subjected.

However, this tracking necessitates the use of the support plate. If the operator does not use such a plate, tracking is not carried out.

An object of the invention is to solve this problem by providing an installation for treating products of the aforementioned type which allows information relating to the products to be managed more reliably.

BRIEF SUMMARY OF THE INVENTION

The invention accordingly relates to an installation of the aforementioned type wherein the component may be fitted on the body or a garment of an operator.

According to particular embodiments, the installation can comprise one or more of the following characteristics, taken in isolation or in any technically feasible combinations:
- the transmission means comprise a transmitter and the information management system further comprises a corresponding receiver which is connected to the information processing unit;
- the transmitter and the receiver are a radiofrequency wave transmitter and receiver respectively;
- the wave frequency emitted by the emitting means of the containers and the workstations is different from that of the waves emitted by the transmitter of the component;
- the transmission means comprise a wired connection connecting the component to the information processing unit;
- the workstation comprises a device for opening the workstation, and the means for emitting radio frequency waves from the workstation are disposed on or in the vicinity of the opening device;
- the workstation comprises a plurality of sites for accommodating the containers and each site comprises means for emitting radiofrequency waves to supply site identification information via the component to the information processing unit;
- the information processing unit is adapted to supply signals refuting or confirming that the component is placed in the vicinity of a site in which a desired container is disposed;
- the information processing unit is adapted to supply signals refuting or confirming that the component is placed in the vicinity of a site in which a container is to be disposed;
- the component is a glove;
- the or each receiving antenna of the glove is accommodated in a finger or the palm of the glove;
- the means for emitting radiofrequency waves have an emitting power lower than 10 mW;
- the means for emitting radiofrequency waves are passive;
- the workstation comprises means for acquiring at least one parameter relating to implementation of the processing operation and a device for transmitting this parameter to the information processing unit in order to associate it with the information for identifying the products treated in the workstation.

The invention further relates to a component which may be fitted on the body or a garment of an operator, the component comprising at least one antenna for receiving radiofrequency waves and means for transmitting identification information received from the means for emitted radiofrequency waves to an information processing unit.

According to particular embodiments, the component may comprise one or more of the following characteristics, taken in isolation or in any technically feasible combination:
- the transmission means comprise a transmitter;
- the transmitter is a radiofrequency wave transmitter;
- the component comprises a wired connection for connecting it to the information processing unit;
- the component is a glove;
- the or each receiving antenna is accommodated in a finger or the palm of the glove.

BRIEF DESCRIPTION OF THE SEVERAL VIEWS OF THE DRAWINGS

The invention will be understood better on reading the following description given merely as an example with reference to the accompanying drawings in which:

FIG. 1 is a schematic view of an installation according to the invention, and

DETAILED DESCRIPTION OF THE INVENTION

Figure 3:
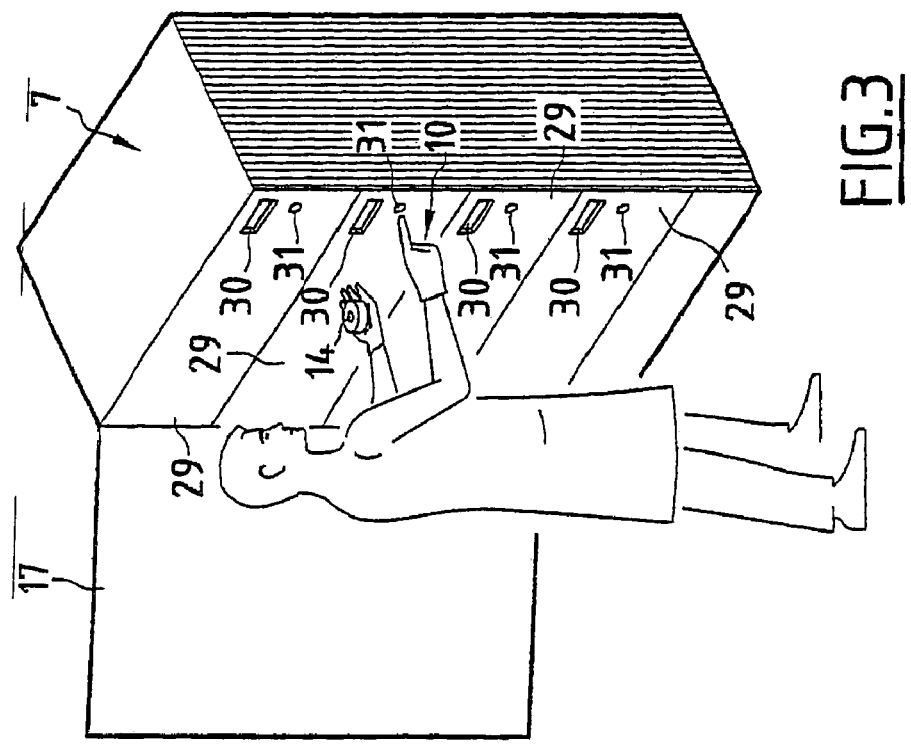
FIGS. 2 to 5 are perspective schematic views illustrating various stages of storage of a container of product to be treated in a workstation of the installation in FIG. 1.

FIG. 1 is a schematic view of an installation 1 for treating products, for example human samples. More precisely, the installation 1 is intended, for example, to subject these samples to an operation of bacterial growth, to perform bacteriological analysis of these samples and to store them.

It will be noted that, in FIG. 1, the scale of the various components to be described hereinafter has not been respected.

The installation 1 comprises:
containers 2 of products to be treated,
workstations 5 to 7,
at least one glove 10 for handling the containers 2, and
a system 12 for managing information relating to the products and, in particular, for tracking the operations to which they are subjected.

The containers 2 are, for example, Petri dishes. Only two of these dishes are shown in FIG. 1. Each of the dishes 2 is equipped with a radiofrequency identification transponder 14.

Each dish 2 contains a culture medium which is seeded with a sample. This seeding has been carried out beforehand under a hood having a laminar flow.

Each transponder 14 conventionally comprises a printed circuit possessing an antenna and on which is disposed an integrated circuit comprising a memory in which is stored an identifier or identification information about the sample contained in the dish 2, and a module for emitting and receiving radiofrequency waves.

Each transponder 14 is a passive transponder, in other words does not comprise standalone electricity supply means such as a cell or a battery. A transponder 14 of this type is supplied with electrical energy via the radiofrequency waves received by its antenna. These received radiofrequency waves are modified as a function of the stored identifier and are backscattered by the transponder 14. A transponder 14 of this type therefore constitutes a means for the stimulated emission of radiofrequency waves. This transponder 14 has a simulated emission power lower than 10 mW or preferably lower than 5 mW. Thus, each transponder 14 has a low range of emission, typically of less than 10 cm. A transponder 14 of this type may be produced in the form of an adhesive flexible pad and is inexpensive.

In other variations, the transponders 14 may be active transponders which optionally have a read/write function.

Typically, the frequency of the waves emitted and received by the transponders 14 is 13.56 MHz or 125 kHz. Other frequencies may obviously be considered.

The workstation 5 is, for example, an incubator adapted to create a controlled atmosphere suitable for the development of bacteria to be detected in culture media.

The workstation 6 is, for example, an analysis device for determining the nature of bacteria present in the culture media of the dishes 2.

The workstation 7 is, for example, a refrigerator for storing the samples contained in the dishes 2, for example for a different type of analysis.

Each workstation 5 to 7 comprises a door, 15 to 17 respectively, for accessing the interior of the workstation. The doors 15 to 17 are provided with handles 20 to 22 for manoeuvring them.

Each workstation 5 to 7 is provided with a radiofrequency identification transponder, 25 to 27 respectively, for example of the same type as the transponders 14.

The transponders 25 to 27 are disposed in the vicinity of the handles 20 to 22 or even on them.

Figure 5:
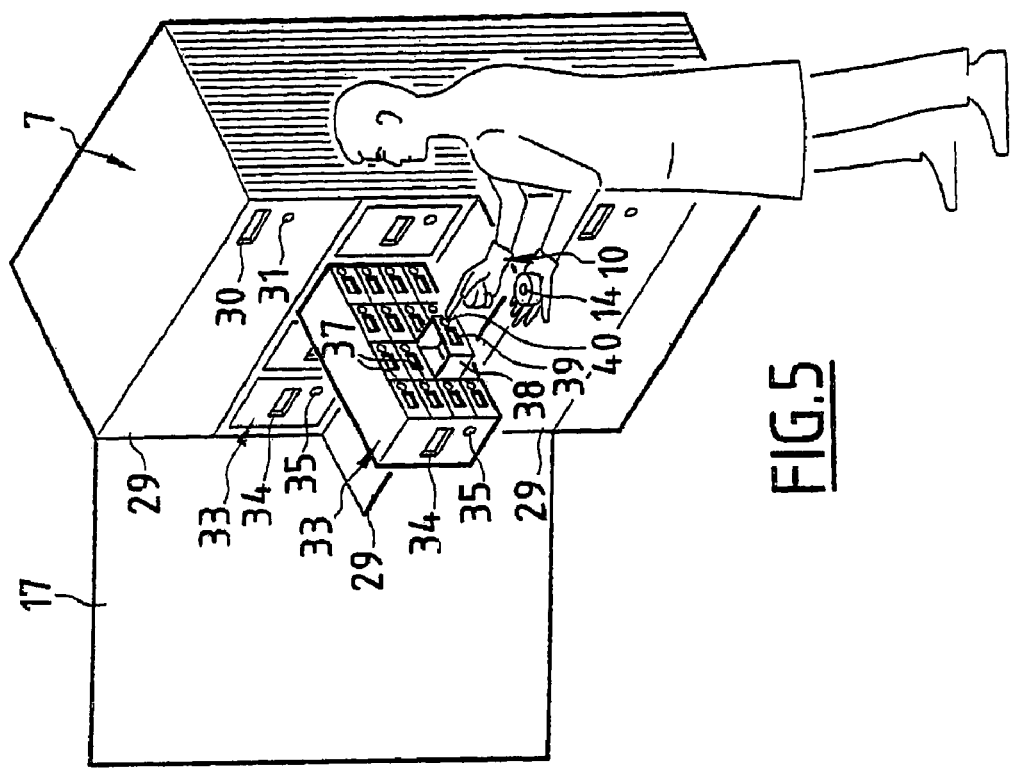
Figure 4:
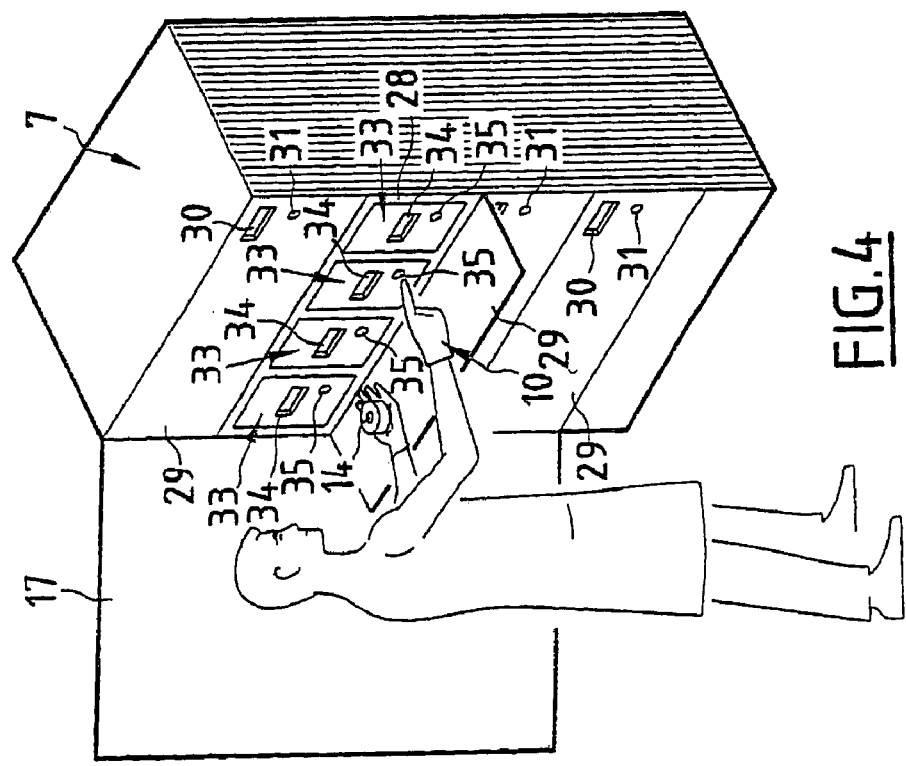

As illustrated more particularly in FIG. 3 to 5, the refrigerator 7 comprises a plurality of superimposed compartments 28 which may be accessed by means of the respective doors 29 once the door 17 of the refrigerator 7 has been opened. FIGS. 3 to 5 show a single compartment 28.

Each door 29 is equipped with a manoeuvring handle 30 and with a radiofrequency transponder 31 for identifying the compartment 28, for example of the same type as the transponders 14. Each transponder 31 is situated, for example, in the vicinity of the handle 30 or even thereon. It will be noted that, in FIGS. 2 to 5, the transponders 31 as well as the other transponders, have been indicated by circles.

Longitudinally sliding storage modules 33 are disposed side by side in each compartment 28. Each module 33 is equipped with a grip handle 34 and a radiofrequency identification transponder 35 disposed in the vicinity or even on the handle 34.

The transponders 35 are, for example, of the same type as the transponders 14.

As shown in FIG. 5, each module 33 comprises racks and partitions which internally delimit a network of recesses 37 which receive transversely sliding drawers 38. These drawers 38 may each be equipped with a handle 39 and comprise a radiofrequency identification transponder 40 disposed in the vicinity or even on the handle 39.

The transponders 40 are, for example, of the same type as the transponders 14.

As shown in FIG. 1, each workstation 5 to 7 is preferably equipped with means 45 to 47 respectively for acquiring parameters relating to the operation carried out in the workstation under consideration. These acquisition means are connected, for example by wired connections 48, to the management system 12.

The glove 10 is a glove of the type conventionally used to handle samples and further comprising an antenna 50 for receiving the radiofrequency waves originating from the transponders 14, 25 to 27, 31, 35 and 40, a first modulator/demodulator 52, a second modulator/demodulator 54 and an antenna 56 for emitting radiofrequency waves at a frequency different from that of the waves emitted by the transponders 14, 25 to 27, 31, 35 and 40. Typically, this frequency may be 433 MHz.

The antenna 50 is disposed, for example, at the end of the index finger of the glove 10, immersed in the material of the glove. It is an antenna having a field of emission and reception with a small range, typically less than 10 cm and preferably 5 cm.

The antennae 50 and 56 and the modulators/demodulators 52 and 54 form a repeater 58 for sending identification information received from the transponders 14, 25 to 27, 31, 35 and 40 to the management system 12.

This repeater 58 may comprise standalone electricity supply means, a clock and optionally a storage memory. The repeater 58 is adapted to proceed automatically and regularly over time or continuously via the modulator/demodulator 52 and the antenna 50 with interrogations in the field of emission and reception of the antenna 50.

These interrogations are carried out by the emission of radiofrequency waves by the antenna 50.

If a transponder 14, 25 to 27, 31, 35 or 40 is present in the field of reception of the antenna 50, this transponder is supplied with electric energy by the signals emitted by the repeater 58 and transmits the identification information stored in its memory in response. If the antenna 50 is disposed in the field of emission of the transponder under consideration, it receives the radiofrequency waves emitted by the transponder. These radiofrequency waves received by the antenna 50 are thus demodulated by the modulator/demodulator 52 then remodulated by the modulator/demodulator 54 and emitted by the antenna 56 in the form of radiofrequency waves having a sufficiently great range to be received by the management system 12, whatever the site of the glove 10 in the installation 1.

The management system 12 comprises:
- a receiver 60 of the radiofrequency waves emitted by the antenna 56 of the repeater 58,
- an electronic information processing unit 62,
- a screen 64,
- a loudspeaker 65,
- a clock 68,
- a database 70 and
- a keyboard 71.

The receiver 60 comprises an antenna 72 and a modulator/demodulator 74 for receiving and demodulating the radiofrequency waves emitted by the antenna 56 and transmitting the corresponding demodulated information to the information processing unit 62.

The unit 62 comprises a microprocessor which is suitably programmed to fulfil the functions described hereinafter.

If an operator wishes to place a sample contained in a dish 2 into the incubator 5, he proceeds as follows.

Having grasped the dish 2 in his left hand inserted into a conventional glove, he points to the transponder 25 of the incubator 5 with the index finger of his right hand, placed in the glove 10. The repeater 58 thus interrogates the transponder 25 which responds with the information identifying the incubator 5. This identification information is sent by the repeater 58 to the information processing unit 62.

The operator then opens the incubator 5 by means of the handle 20, then places the dish 2 on an internal rack of the incubator 5. He then points to the transponder 14 of the dish 2 under consideration with the index finger of his right hand. The repeater 58 then interrogates the transponder 14 and receives the information identifying the sample introduced into the incubator 5, which it transmits via the receiver 60 to the information processing unit 62. The unit 62 combines the two items of identification information received and an item of time information supplied by the clock 68 and stores them in the data base 70. It is thus known that the sample under consideration has been placed in the incubator 5.

The information processing unit 62 then regularly combines in time and stores in the database 70 the information received from the acquisition means 45 with the time information supplied by the clock 68 and the information identifying the sample under consideration. This takes place in time until the sample under consideration is removed from the incubator 5.

For this purpose, the operator proceeds as described hereinbefore, in other words he will place the antenna 50 of the glove 10 in the vicinity of the transponder 25 of the incubator 5, opens its door 15 then places the antenna 50 of the glove 10 in the vicinity of the transponder 14 of the dish 2 containing the sample under consideration. Finally, the operator removes this dish 2 from the incubator 5.

The information processing unit 62 then again receives information identifying the incubator 5 and the sample contained in the dish 2 removed from the incubator 5 via the repeater 58 and the receiver 60. The unit 62 combines this information as well as time information supplied by the clock 68 with a removal of the sample under consideration from the incubator 5. These various associated items of information are stored in the database 70.

With regard to the identifier of the sample under consideration, it is similarly possible to store, in the database 70, information indicating whether it has been introduced into the analysis device 6, when, for how long it remained in the analysis device 6, if it has been removed therefrom, when, and what the result of analysis was. This last item of information is supplied by the acquisition means 46.

Following analysis and after removal of the dish 2 under consideration from the analysis device 6, the dish 2 may be stored in the refrigerator 7 in the following manner.

Figure 2:
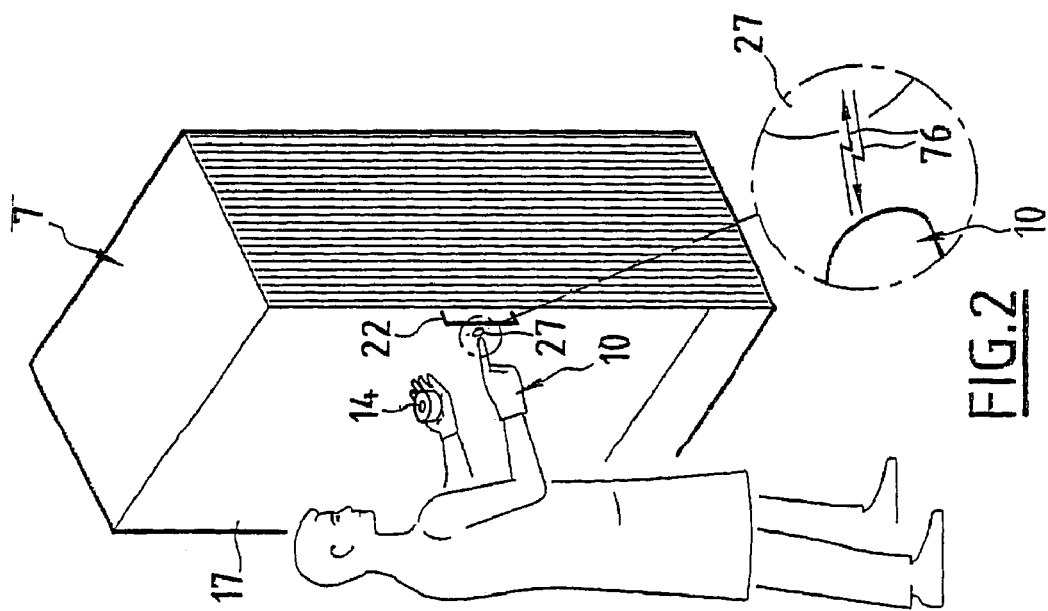

As shown in FIG. 2, the operator firstly places the index finger of the glove 10 in the vicinity of the transponder 27 of the refrigerator 7 so that the unit 62 receives information identifying the refrigerator 7. The emission and reception of radiofrequency waves between the glove 10 and the transponder 27 have been indicated by the arrows 76 in the enlarged circled portion of FIG. 2. The operator then opens the door 17 by means of the handle 22.

Next, and as illustrated in FIG. 3, the operator places the index finger of the glove 10 in the vicinity of the transponder 31 of the door 29 of the compartment 28 in which he wishes to store the dish 2. The information identifying the compartment 28 is then transmitted to the information processing unit 62.

The operator then opens the door 29 and accesses the selected compartment 28.

Next, and as shown in FIG. 4, the operator then points the index finger of his right hand toward the transponder 35 of the storage module 33 in which he wishes to store the dish 2. The information processing unit 62 then receives the information identifying the selected storage module 33. The operator then extracts the storage module 33 under consideration by means of its handle 34.

As shown in FIG. 5, the operator finally points to the transponder 40 of the drawer 38 in which he wishes to place the dish 2 in order to transmit the information identifying the drawer 38 to the unit 62. Finally, he places the dish 2 in the selected drawer 38 and places the index finger of his right hand in the vicinity of the transponder 14 of the dish 2.

The unit 62 has thus received the identifiers of the refrigerator 7, the compartment 28, the module 33 and the drawer 38 in which the sample under consideration has been stored as well as the identifier of the sample. These various items of information are combined with an item of time information supplied by the clock 68 and are stored by the unit 62 in the database 70.

The database 70 therefore contains information demonstrating that the sample under consideration is stored in the refrigerator 7 and the exact site of this sample in the refrigerator 7.

To remove the sample under consideration from the refrigerator 7, the operator proceeds in a similar manner by successively supplying to the information processing unit 62, by means of the index finger of his right hand, the information for identifying the refrigerator 7, the compartment 28, the module 33 and the drawer 38 to which he has access and finally the sample which he removes therefrom.

It will be noted that the unit 62 can also guide the operator during an operation of introducing the sample into or removing it from the refrigerator 7 by supplying him with signals refuting or confirming the acts which he performs via the screen 64 and/or the loudspeaker 66.

Thus, if the operator wishes to access a given sample stored in the refrigerator 7, he can enter a code corresponding to this sample by means of the keyboard 71. The unit 62 then supplies him, for example via the screen 64, with information concerning the exact location of this sample in the installation 1.

The operator is thus directed toward the refrigerator 7 and places the index finger of his right hand in the vicinity of the transponder 27. The unit 62 causes the emission, for example via the loudspeaker 66, of a sound signal confirming that the desired sample is actually located in the refrigerator 7.

If the operator had inadvertently pointed to the transponder 25 of the incubator 5, the loudspeaker 66 would have emitted a different signal, indicating that the desired sample is not located therein.

Next, the unit 62 will supply, via the loudspeaker 66, signals confirming or refuting that the operator is accessing the correct compartment 28, the correct module 33 and the correct drawer 38 in order to remove the desired sample.

Similarly, if the operator wishes to store a sample, the information processing unit 62 can indicate the site of a free drawer 38 to him and guide him to it.

Thus, the above-described installation 1 allows user-friendly, reliable management of information concerning the samples treated by the installation 1 and, in particular, tracking of the treatment operations to which the samples have been subjected. Furthermore, the installation 1 enables the location of the samples to be known and the operator to be guided.

This management and this guidance are particularly user-friendly because the operator merely has to place his hand in the vicinity of the transponders corresponding to the sites where he is working. In addition, information management is reliable because the operator has to use a glove to handle the samples and the dishes 2 containing them.

To further improve this user-friendliness, the glove 10 can comprise a plurality of antennae 50, for example one antenna in each of the fingers and/or in the palm of the glove.

If the identification transponders are placed on the handles 20 to 22, 30, 34 and 39, it is not necessary specifically to point to these transponders via the index finger of the glove 10, the identification information being acquired automatically when the handles are grasped by the operator.

In a variation, not shown, the glove 10 can comprise means for activating interrogation by the repeater 58. In this case, the operator activates interrogation as necessary.

In the example described above, the modulators/demodulators 52 and 54 and the antenna 56 form means for transmitting identification information received by the antenna 50 to the unit 62.

In variations, not shown, these means for transmitting identification information may have a structure different from that described.

Thus, they may be replaced by a wired connection connecting the glove 10 directly to the modulator/demodulator 74 which is thus adapted to demodulate the radiofrequency waves received by the antenna 50 before supplying the identification information to the processing unit 62.

In a further variation, these transmission means may comprise an infrared wave transmitter for transmitting information to a corresponding receiver 60 associated with the unit 62.

In yet a further variation, the transmission means can comprise an intermediate relay device carried by the operator. The glove 10 may, for example, be connected to this intermediate device by a wired connection.

In a further embodiment, not shown, the unit 62, the screen 64, the loudspeaker 66, the clock 68, the database 70 and the keyboard 71 may be incorporated in the glove 10 itself, for example on the back of the glove, or may form a portable management system 12 carried by the operator. The signals for guiding the operator may thus be simply visual signals supplied by the screen 64.

The information received by the acquisition means 45 and 47 may thus be transmitted to the unit 62 by remote links, for example by radiofrequency waves.

In yet a further variation, not shown, the above-described principles may be employed merely to locate samples in the installation 1 which does not comprise acquisition means 45 to 47.

In a variation, during guidance of the operator, the unit 62 prevents access to sites other than the desired site by locking the corresponding doors.

In general, the containers 2 may be containers other than Petri dishes, for example test tubes, or may not contain the samples directly.

In a variation, the operator may carry a badge equipped with a radiofrequency identification transponder which he will interrogate by means of the glove 10 before each operation of introduction or removal which he performs. The various items of information associated with the samples are thus combined with the identity of the operator who has worked on the sample.

It will be noted that the described installation 1 may be produced from pre-existing workstations and containers 2 without the need for significant or expensive modifications.

For this purpose, in fact, it is sufficient to equip the workstations and the containers 2 with passive transponders such as those described hereinbefore, which are particularly inexpensive. More particularly, if the transponders are adhesive pads, they merely have to be stuck on the walls of the workstations and containers.

In certain variations, the identification transponders, in particular 14, may be used for reading and writing. The glove 10 is then used as a writing device.

In yet a further variation, the keyboard 71 may be replaced by input means of a different type.

In general, the invention may be applied to any installation for treating biological substances or products, and the workstations may be, for example, incubators, ovens, refrigerators, benches with overhead laminar flow hoods, centrifuges, or any workstation equipped with means for carrying out a treatment operation.

The term "treatment" here is interpreted generally as any operation or sequence of operations where a product is subjected to predetermined conditions or interventions, and can consist of a simple operation of storage under predetermined conditions.

Thus, the installation may comprise a single workstation in the form of a refrigerator.

More generally, the foregoing principles may apply to the treatment of products in fields other than the biological field. They may thus be applied, for example, to the manufacture of electronic components.

Even more generally, the glove may be replaced by a component which may be fitted on the body or a garment of an operator. In other words, the component will thus comprise standalone holding means relative to the operator's body or garment.

Thus, the component may be fittable on an upper limb of the operator and may consist of a ring, a bracelet which is adjustable to the arm or to the wrist, one or more glove fingers, etc.

The invention claimed is:

1. An installation for the treatment of products, comprising:
   containers for products to be treated and equipped with means for emitting radiofrequency waves to supply product identification information,
   at least one workstation for carrying out a product treatment operation, the workstation being equipped with means for emitting radiofrequency waves to supply workstation identification information, and
   a system for managing information relating to the products, the system comprising a database, an information processing unit and at least one component itself comprising:
      at least one antenna for receiving the radiofrequency waves emitted by the emitting means of the containers for products and the emitting means of the workstation to allow the component to receive the product identification information and the workstation identification information, and
      means for transmitting the received product identification information and the workstation identification information, received from the means for emitting radiofrequency waves, to the information processing unit so that the information processing unit combines the product and workstation identification information and stores the combined product and workstation identification information in the database,
   wherein the component adapted to be fitted on the body or a garment of an operator.

2. An installation according to claim 1, wherein the transmission means comprise a transmitter and the information management system further comprises a corresponding receiver which is connected to the information processing unit.

3. An installation according to claim 2, wherein the transmitter and the receiver are a radiofrequency wave transmitter and receiver respectively.

4. An installation according to claim 3, wherein the wave frequency emitted by the emitting means of the containers and the workstations is different from that of the waves emitted by the transmitter of the component.

5. An installation according to claim 1, wherein the transmission means comprise a wired connection connecting the component to the information processing unit.

6. An installation according to claim 1, wherein the workstation comprises a device for opening the workstation, and the means for emitting radio frequency waves from the workstation are disposed on or in the vicinity of the opening device.

7. An installation according to claim 1, wherein the workstation comprises a plurality of sites for accommodating the containers and in that each site comprises means for emitting radiofrequency waves to supply site identification information via the component to the information processing unit.

8. An installation according to claim 7, wherein the information processing unit is adapted to supply signals refuting or confirming that the component is placed in the vicinity of a site in which a container is disposed.

9. An installation according to claim 1, wherein the information processing unit is adapted to supply signals refuting or confirming that the component is placed in the vicinity of a site in which a container is to be disposed.

10. An installation according to claim 1, wherein the component is a glove.

11. An installation according to claim 10, wherein the receiving antenna of the glove is accommodated in a finger or the palm of the glove.

12. An installation according to claim 1, wherein the means for emitting radiofrequency waves have an emitting power lower than 10 mW.

13. An installation according to claim 12, wherein the means for emitting radiofrequency waves are passive.

14. An installation according to claim 1, wherein the workstation comprises means for acquiring at least one parameter relating to implementation of the processing operation and a device for transmitting this parameter to the information processing unit in order to associate it with the information for identifying the products treated in the workstation.

15. An installation according to claim 1, wherein the workstation is an incubator.

16. An installation according to claim 1, wherein the workstation is an oven.

17. An installation according to claim 1, wherein the workstation is a refrigerator.

* * * * *